G. W. BULLEY.
VEHICLE.
APPLICATION FILED FEB. 21, 1917.
1,254,979.
Patented Jan. 29, 1918.
2 SHEETS—SHEET 1.
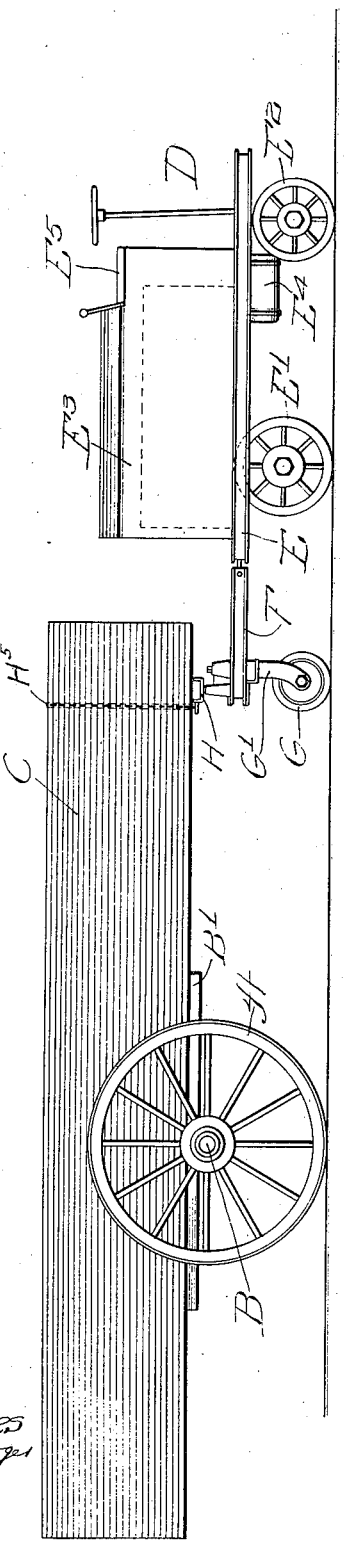
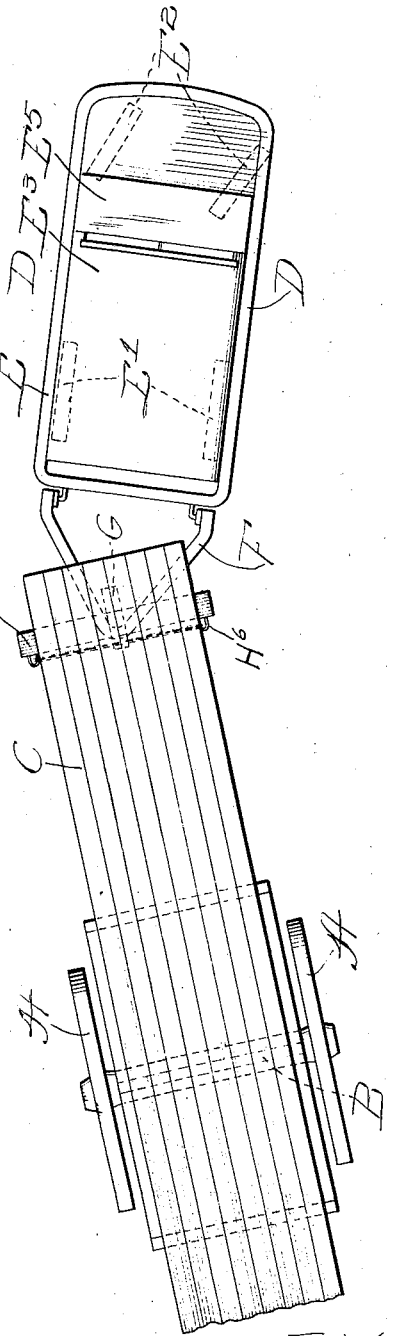

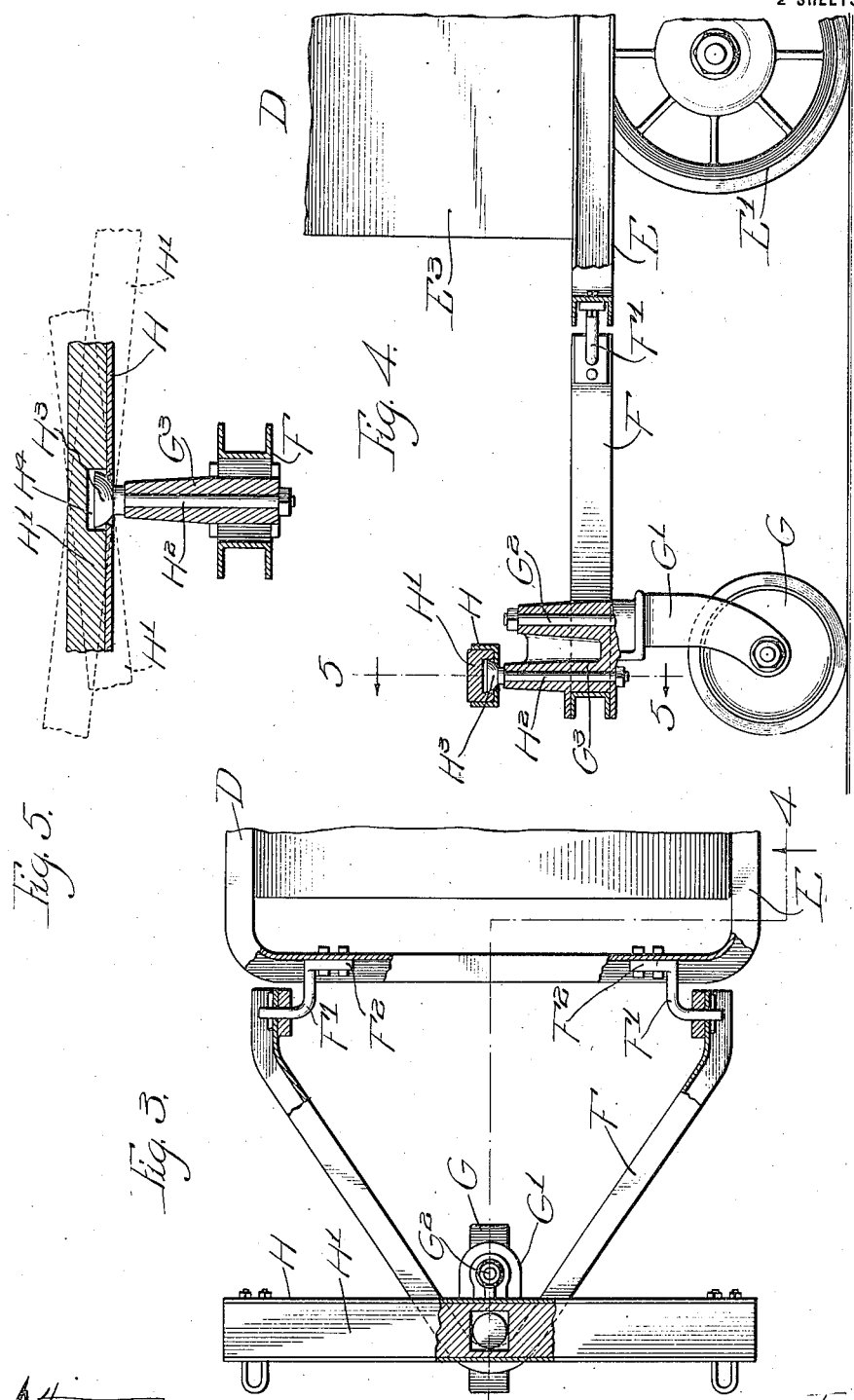

UNITED STATES PATENT OFFICE.

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

VEHICLE.

1,254,979.   Specification of Letters Patent.   Patented Jan. 29, 1918.

Application filed February 21, 1917. Serial No. 150,080.

*To all whom it may concern:*

Be it known that I, GEORGE W. BULLEY, a citizen of the United States of America, and resident of Chicago, Cook county, Illinois, have invented a certain new and useful Improvement in Vehicles, of which the following is a specification.

My invention relates to improvements in vehicles for carrying or transporting lumber and like material, more especially about lumber yards, docks, warehouses, freight platforms and the like, and my object is to provide a power propelled vehicle for this purpose which will be simple, durable and reliable in construction and effective and efficient in operation.

Other objects of my invention will appear hereinafter.

My invention consists in the features of novelty exemplified by the construction, combination and arrangement of parts hereinafter described, shown in the accompanying drawings, and more particularly set forth in the appended claims.

Referring to the accompanying drawings:

Figure 1 is an assembled view in side elevation of a complete vehicle or carrier structure embodying my invention.

Fig. 2 is a top plan view thereof showing the structure in the act of turning a curve.

Fig. 3 is an enlarged top plan view of the articulated trailer.

Fig. 4 is an enlarged side elevation partly in section on the line 4—4 of Fig. 3.

Fig. 5 is an enlarged detail section on the line 5—5 of Fig. 4.

It is the general practice, where lumber and like material is loaded onto and unloaded from cars and boats and to be transported on and about docks, wharves, freight platforms and lumber yards, to utilize what are commonly called lumber bunkers. These bunkers consist merely of two large wheels and a flat frame mounted on a suitable axle, the frame or platform on the axle between the wheels being used for the lumber. The lumber is piled or stacked on these frames with the axle about midway of the length of the load so that the weight of the load on each side of the axle is practically balanced. These bunkers with their loads are then pulled around either manually by the workmen or by means of two wheeled vehicles drawn by horses. It is my purpose to propel the loads from place to place by power vehicles and to provide a system whereby the men's time and energy will be utilized merely for the purpose of loading and unloading the bunkers and in consequence the number of men reduced and the size of the loads increased and transferred in considerably less time. However, in accomplishing these results I utilize the usual or standard bunkers and merely add to the equipment the initial cost and the low maintenance of a power unit for propulsion purposes.

A lumber bunker, such as I have just referred to, is illustrated in Figs. 1 and 2. It comprises a pair of large diameter wheels A spaced apart and mounted to rotate independently on the transverse axle B. This axle carries a flat rectangular frame or platform $B^1$ on which the lumber is loaded. The load which I have illustrated as a pile of lumber boards C laid lengthwise one upon the other, is positioned on this bunker frame at right angles to the axle. The weight of the load above on the frame is generally relied upon to maintain the load in proper position. The pile of lumber is usually almost balanced on the axle so as not to impose too great a weight upon the men handling it. As illustrated in the drawings, there is, however, a slight preponderance of weight on one side of the axle—that is, on the forward side nearest the tractor or propelling vehicle. The power vehicle D, which I have illustrated, is an electrically driven tractor of the non-load carrying type such as embraced within the subject matter of U. S. Letters Patent Number 1,217,702, issued Feb. 27, 1917, but any other type of vehicle for carrying out the principles and functions of my invention may be used. This tractor is preferable because it is small and compact, has an extremely short turning radius and is particularly designed and adapted for industrial haulage about platforms and the like. In general this tractor has a horizontal frame E supported by two rear wheels $E^1$ and two front steering wheels $E^2$. A storage battery and housing $E^3$ therefor is mounted on the rear of the frame so as to impose its weight upon the rear wheels for tractive purposes. A driving motor $E^4$ is suspended beneath the frame and connected to the rear wheels in driving relation. The operator has a seat $E^5$ from which to steer and control the tractor. On the rear end of the tractor I provide a trailer or carrier which involves a frame F, a supporting caster wheel G, and a load supporting member H. The frame is normally substantially horizontally disposed in substantially the plane of the tractor frame, although it is pivoted on the tractor frame to move or articulate in a vertical plane to adapt the structure to irregularities in the road. The frame is substantially triangular or V-shaped and the ends of its legs have bearings which pivot on studs $F^1$ which project laterally from lugs or brackets $F^2$ bolted on the rear end of the tractor frame; hence the tractor may be readily detached if desired. The caster supporting wheel is located beneath the rear end of the trailer frame and is rotatable about a vertical pivot or center so that it will adapt itself to any line or direction of movement which the structure takes. This caster is rotatable in a fork $G^1$ which has an extension $G^2$ journaled in a bearing in a casting member $G^3$, this casting being located in the apex of the triangular frame F and preferably welded to said frame. The load supporting and draft member H is positioned above the trailer frame and is arranged in substantially the same plane as the frame of the lumber bunker. This member is preferably formed of a channel bar for strength and in the groove thereof is fastened a bar $H^1$ of wood. This member is substantially as long as the width of the tractor frame. A bolt $H^2$ is fastened in a long bearing in the casting $G^3$ and has a hemispherical head $H^3$ at its upper end. This head is positioned in a cut-out $H^4$ in the wooden bar $H^2$ but is held in position by the smaller hole in the channel. This construction forms a universal joint which permits the bar to rock freely vertically and pivot horizontally to accommodate the torsional movements to which the entire structure is subjected due to irregularities in the road. As indicated in the drawings the end portion of the load of lumber is rested on the load member H, being spaced from the end of the tractor sufficiently to prevent its interference with the turning of the train. The draft connection between the bunker and the hauling unit is thus obtained directly through the load. The weight of lumber on the load member may be relied upon to develop sufficient friction to draw the load; it is preferable to fasten the lumber to the member H. This may be readily and conveniently done by passing a chain $H^5$ around the end of the pile of lumber and fastening it to the load member H. For this purpose the load member H has two convenient loop members $H^6$ extending rearwardly at its ends and through which the holding chains may be fastened. It is thus seen that the entire equipment utilizes the standard bunker without alteration in any respect, that the trailer, although connected to the tractor, is completely articulated in every respect not only as to its own parts but also as to its relation to the tractor, and serves as an intermediate supporting and carrying vehicle between the load and the hauling unit.

I claim:

1. The combination of a lumber bunker, a power propelled tractor, an intermediate trailer connected to said tractor and having means for supporting one end of the load on the bunker.

2. The combination of a loaded lumber bunker comprising a pair of wheels, an axle therefor and a load of lumber substantially balanced thereon, a power propelled tractor, a trailer connected with the tractor and having means for supporting one end of and connected with the load on the bunker.

3. The combination of a lumber bunker, a power propelled tractor, a trailer pivotally connected with the rear end of the tractor and having an independent wheel support, and a load supporting member on said trailer for supporting one end of the load carried by the bunker.

4. The combination of a power propelled tractor and a trailer articulated with respect to the tractor and embodying a frame pivotally connected to the frame of the tractor and having a supporting caster wheel and a pivotally mounted load supporting member carried by said frame.

5. The combination of a lumber bunker, a power propelled tractor, a trailer articulated with said tractor and having independent wheel supporting means, and a load supporting member carried by said trailer upon which one end of the load carried by the bunker is supported.

6. The combination of a power tractor, a frame pivoted on the rear end of the tractor to move vertically, a caster wheel supporting the rear end of the frame, and a load supporting member centrally swiveled on the rear portion of said frame.

7. The combination of a power tractor, a triangular frame pivotally mounted at separated points on the rear end of the tractor to swing vertically, a caster supporting wheel supporting the apex end of said frame, and a swiveled bar on said frame.

Signed by me at Chicago, Illinois, this 6th day of February, 1917.

GEORGE W. BULLEY.